March 17, 1964 — A. W. LUNDELL — 3,125,144

LOCKING MEANS FOR MEAT CHOPPER

Filed Sept. 22, 1961 — 2 Sheets-Sheet 1

INVENTOR.
ARNOLD W. LUNDELL
BY *Gustav Drews*
his ATTORNEY

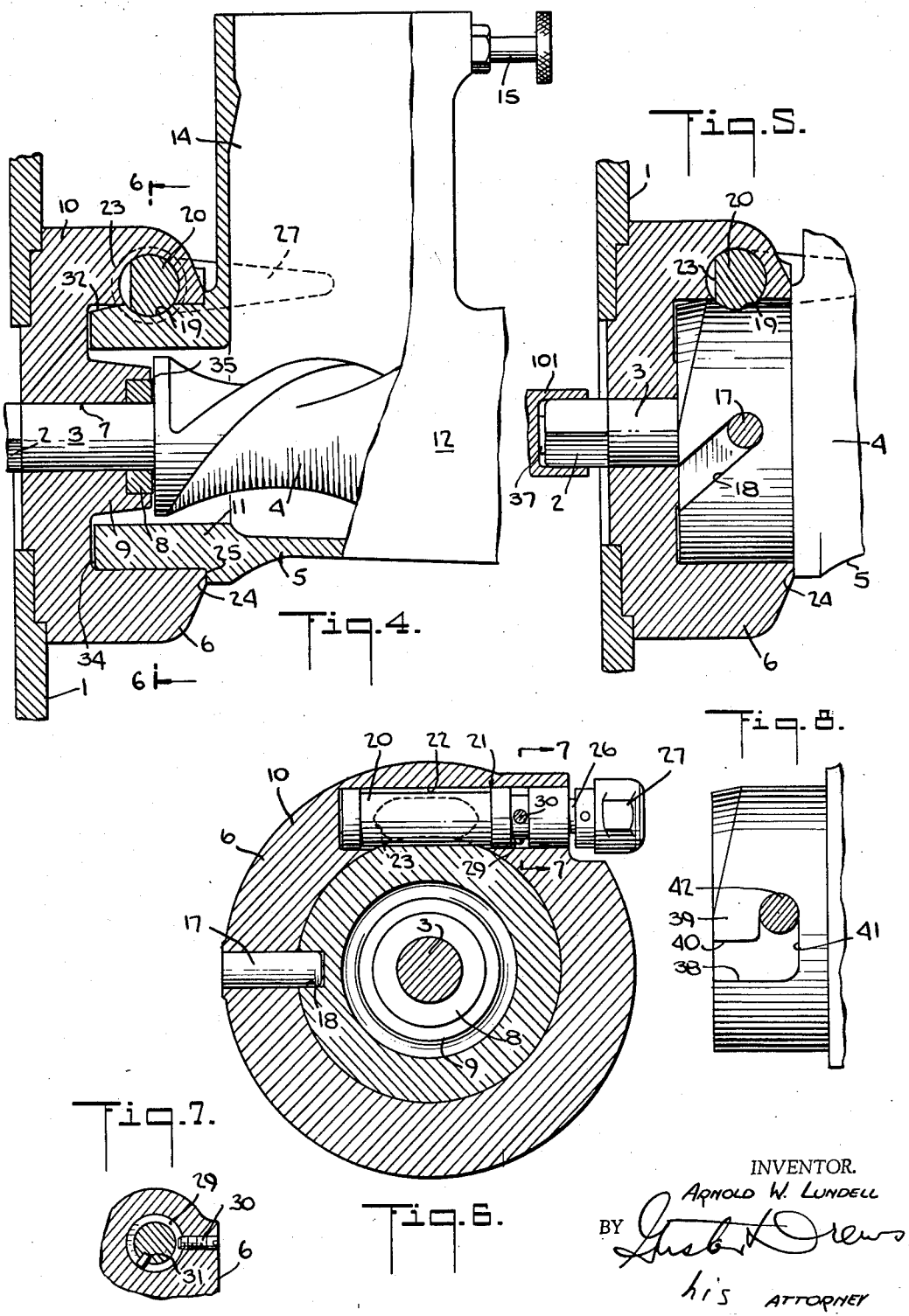

United States Patent Office 3,125,144
Patented Mar. 17, 1964

3,125,144
LOCKING MEANS FOR MEAT CHOPPER
Arnold W. Lundell, 220 Byram Shore Road,
Byram, Conn.
Filed Sept. 22, 1961, Ser. No. 140,977
3 Claims. (Cl. 146—182)

This invention relates to power driven commodity processing machines such as meat choppers and the like having a fixed frame provided with a driving shaft and a removable casing adapted to be connected to said frame and having an advancing screw adapted to be drivingly connected to said driving shaft, a cutter at the discharge end of the screw and casing, and an inlet at the upper end of the casing having access to the screw. This application constitutes a continuation-in-part of application for patent Serial No. 120,315, filed June 28, 1961, now abandoned.

Among the objects of the present invention it is aimed to provide an improved connection between the casing and frame of a power driven commodity processing machine in which the frame is provided with a driving shaft and the casing is adapted to be connected to the frame and has an advancing screw adapted to be drivingly connected to the driving shaft of the frame, a cutter at the discharge end of the screw and casing, and an inlet at the upper end of the casing having access to the screw, in which the connection when connecting the casing to the frame draws the casing into its final alined position with the frame thereby to eliminate the possibility of anchoring the casing to the frame in a wrongful or unalined relationship.

It is still another object of the present invention to provide a connection between the casing and frame of a power driven commodity processing machine such as heretofore set forth which will not receive the conventional cam of a machine of this kind unless the casing is positioned in its final alined location.

More specifically the improved connection consists in an arcuate external slot such as a curved or angular slot in the sleeve of the casing to receive a fixed pin in the frame requiring the casing to be turned and drawn into final alined position with the frame.

Specifically it is still a further object of the present invention to provide an improved connection contemplating an arcuate slot in the sleeve of the casing to receive a fixed pin in the frame and a cam slot in such sleeve to receive a cam pin in the frame requiring the casing to be turned and drawn into alined position before the cam pin can be rotated finally to lock the casing to the frame.

These and other features, capabilities and advantages of the invention will appear from the subjoined detailed description of specific embodiments thereof illustrated in the accompanying drawings, in which FIG. 1 is a perspective showing the casing and frame of the machine in assembled position of one embodiment.

FIG. 4 is a fragmental enlarged side view partly in section showing the casing and frame shown in FIG. 1 in its finally alined and locked position.

FIG. 5 is a fragmental sectional view similar to FIG. 4 showing the side view of the sleeve of the casing.

FIG. 6 is a section on the line 6—6 of FIG. 4.

FIG. 7 is a fragmental section on the line 7—7 of FIG. 6.

FIG. 8 is a fragmental view of a part of a second embodiment.

Figure 1:
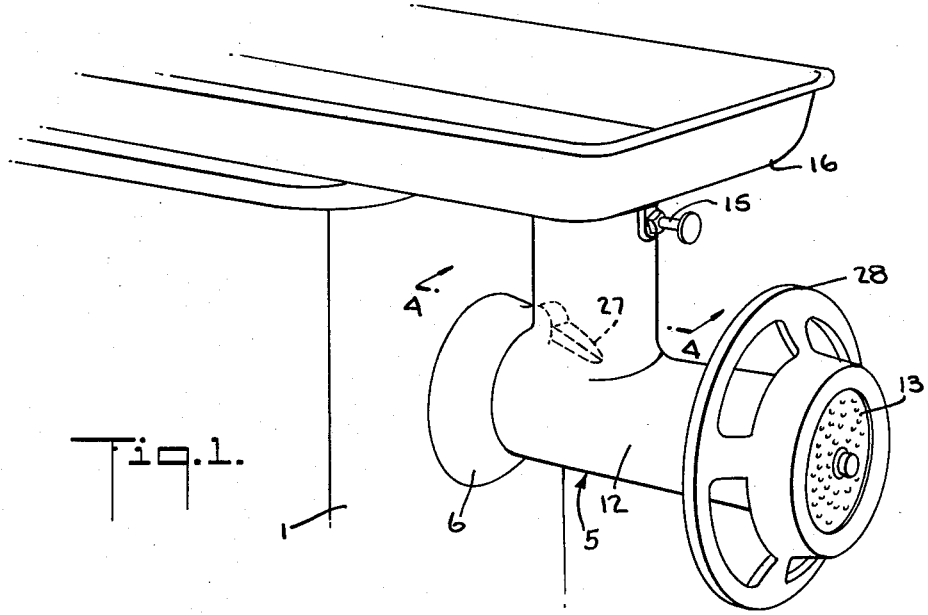

In the embodiment shown in FIGS. 1 to 7 inclusive there is illustrated a frame 1, see my United States Letters Patents Nos. 2,665,724 and 2,693,835 containing a motor, not shown, which motor has a sleeve 101 to receive the angular extension 2 of the stub shaft 3 of the worm 4 which extends through the casing 5. The casing 5 is removably connected to the sleeve 6 of the frame 1.

The stub shaft 3 extends through, and rotates in the bearing 7 having the neoprene oil seal 8 formed at the outer end of the bearing 7 in the sleeve 6 and then extends inwardly therefrom through the opening 7 into the casing 1 to enable its angular extension 2 to enter the coupling sleeve 101 of the motor disposed in the frame 1.

The seal 8 is disposed in a recess formed in the annular extension 9 of the sleeve 6 which is spaced from the outer annular extension 10. In the space between the annular extensions 9 and 10 there extends the annular extension 11 of the casing 5.

The casing or head 5 in the present instance consists of the conventional barrel 12 through which the worm 4 extends which has a conventional stub shaft at its outer or front end journalled in the present instance in the perforated disk 13 between which and the discharge end of the worm 4 there is mounted the conventional rotary cutter such as disclosed in my United States Letters Patents Nos. 2,665,725 and 2,539,448 and in United States Letters Patent No. 2,505,797 of P. M. Sivertsen.

The barrel 12 in the present instance is provided with an inlet funnel 14 at the upper end of which there is provided the spring-pressed pin 15 to engage and anchor the extension, not shown, of the pan 16. The connection between the sleeves 10 and 11 constitutes the main part of the present invention and consists essentially of two main locking devices which cooperate with one another and with the operation of the worm 4 effectively to anchor the casing 5 to the sleeve 6 of the frame 1.

One of these locking devices consists in the pin 17 extending through the annular extension 10 and projecting from the inner periphery of the annular extension 10 about one-quarter of an inch. The annular extension 11 of the casing 5 in turn is provided with an external arcuate recess such as the curved slot 18 to receive the pin 17. Since the worm 4 in feeding and cutting operation looking from the outer front end of the barrel 12 rotates in a counter clockwise direction, and the slot 18 starting from the rear edge of the annular extension 11 extends upwardly as it continues forwardly along the annular extension 11, after the casing 5 has once been connected through the slot 18 receiving the pin 17, when the worm 4 is rotated, it will urge the connection 17 and 18 of the annular extensions 10 and 11 into intimate locking position.

The second locking device consists essentially of a transversely extending concave recess 19 in the upper end of the annular extension 11 to receive the cylindrical portion 20 of the pin 21 disposed in the recess 22 extending through the annular extension 10 of the sleeve 6 and communicating with the space between the annular extensions 9 and 10 of the sleeve 6 so that when the concave recess 23 of the cylindrical portion 20 is disposed in alinement with the inner periphery of the annular extension 10, the annular extension 11 may be moved into or rotated into position inside of the annular extension 10. After the annular extension 11 has been turned relative to the pin 17, until the pin is disposed near or at the innermost end of the arcuate recess 18 where the shoulder 24 of the barrel 12 rests against the shoulder 25 of the annular extension 10, the pin 21 may be rotated in a clockwise direction looking at the left hand side of the machine when the recess 23 will move up to the left of the opening 22, looking at FIG. 5, and the cylindrical arcuate portion of the cylindrical portion 20 will move into the depression or recess 19 to lock the annular extension 11 against axial movement outwardly.

From the foregoing it will appear that the arcuate recess 18 in cooperation with the pin 17 will tend to move the cylindrical extension 11 into the cylindrical extension 10 in turn into intimate engagement of the shoulder 24 of the casing 5 with the shoulder 25 of the sleeve 6 and that the pin 21 will then cooperate with the surface of the annular extension 11 in the recess 19 to anchor the casing 5 against axial movement outwardly from the sleeve 6.

In order to actuate the pin 21 into and out of locking position, its end portion 26 extending out of the opening 22 is provided with the handle 27.

Due to the weight of the casing approaching nine and one-half pounds without the worm 4 and cutter and locking ring 28, and equaling about fifteen and one-quarter pounds with the worm 4 and cutter and locking ring 28, it is desirable that the effort required by the attendant in removing and reconnecting the casing 5 to the sleeve 6 be reduced to a minimum. As an instance with this construction, since the locking ring 28 as a rule is not turned to its home position until the casing 5 has been connected to the sleeve 6, should the attendant due to the weight of the casing 5, with the worm 4 and cutter and locking ring 28, not having moved the casing 5 to its extreme operative position, the funnel 14 will be inclined relative to the casing 1 when the pan 16 cannot be positioned on the funnel 14. The attendant will then know that he has not moved the casing 5 into its final operative position in the sleeve 6 and will of course adjust the position. In turn since the handle 27 cannot be rotated to anchor the casing 5 to the sleeve 6 until the annular extension 11 has been moved into its final position in the extension 10, this will be a second indication to the attendant that he has not properly positioned the casing 5 in the sleeve 6. In turn since the locking ring 28 when turned into locking position is rotated in a clockwise direction looking from the front of the machine, there is a tendency toward the end of the locking rotation to swing the casing 5 out of the arcuate slot 18 so that the funnel 14 would be inclined to the frame 1 in the position shown in FIG. 3 when the handle 27 could not be swung down into the locking position achievable when the cylindrical area of the cylindrical portion 20 enters the recess 19. Since the locking ring 28 is not directly connected with the worm 4, after the casing 5 has once been moved into its final operative position and the handle 27 has been turned down into the dotted line position shown in FIGS. 1 and 5, the rotation of the worm 4 in a counterclockwise direction, the normal rotation of movement, looking from the front of the machine, this actuation of the worm 4 would of course in no way affect the position of the locking ring 28 on the barrel 12 of the casing 5.

Excellent results have been achieved when the worm 4, casing 5, locking ring 28 and sleeve 6 are composed of cast iron, and the cutter, not shown, and pin 17 composed of steel.

To anchor the pin 20 against accidental axial movement but allow for rotation of the same, there is provided an annular recess 29 to receive the pin 30 extending through the sleeve 6 into the recess 29.

Figure 2:
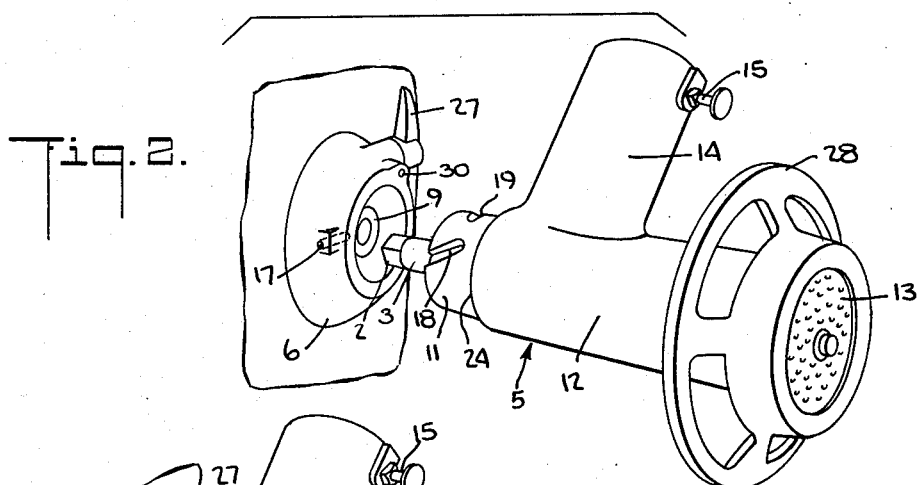
FIG. 2 is a perspective exploded view showing a part of the frame and the casing shown in FIG. 1 separated from one another.
Figure 3:
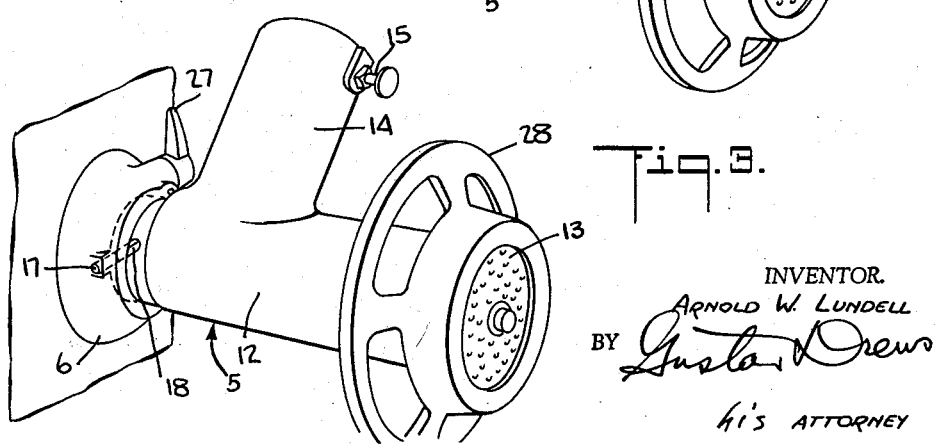
FIG. 3 is a perspective view similar to FIG. 2 with the casing shown in FIG. 1 initially extending into the frame.

Furthermore from the pin 20 at the bottom of the recess 29 there extends the pin 31 to act as a stop to cooperate with the pin 30 and limit the movement of the handle 27 when raising it from the locked position shown in FIGS. 1 and 4 into the unlocked position shown in FIGS. 2 and 3.

To facilitate the initial movement of the annular extension 11 into the annular extension 10, the inner end is chamfered at 32.

To avoid any possible misunderstanding with regard to the connections of the several parts of the mechanism, it is of course understood that there will be a clearance 33 at the inner end of the pin 21, a clearance 34 between the inner end of the sleeve 11 relative to the sleeve 6, a clearance 35 at the inner end of the worm 4 relative to the neoprene oil seal 8, a clearance 36 between the inner end of the pin 17 and the arcuate slot 18 and a stop pin 37 provided between the inner end of the angular extension 2 and the coupling sleeve 101.

When turning the locking ring into locking position should the cam pin 21 not be in locking position, the casing 5 relative to the sleeve 6 may be separated in which case the stop pin 37 will clear the coupling sleeve 101.

Instead of the curved slot 18, an angular or bayonet slot 38 may be formed emerging in the exterior face of the annular extension 39 which has an axially extending portion 40 continuing from the rear face of the annular extension 39 and merging into the laterally extending portion 41. With the angular recess 38 when connecting the casing 5 to the sleeve 6, the casing 5 will of course be moved axially to enable the pin 42 to enter the axially extending portion 40 until it reaches the laterally extending portion 41 when the casing 5 will be turned to enable the pin 42, such as the pin 17 of the embodiment of FIG. 1, to move into the inner end of the laterally extending portion 41. Thereupon the handle 27 may be turned downwardly into the position shown in FIG. 4 to lock the casing 5 to the sleeve 6.

In the claims the term "arcuate" will be understood broadly to cover both the curved recess 18 of the embodiment illustrated in FIGS. 1 to 7 inclusive and the angular recess 38 illustrated in FIG. 8.

It is obvious that whether the pin 17 of the embodiment illustrated in FIG. 1 and the pin 42 of the embodiment illustrated in FIG. 8 are mounted on the annular extension 11 instead of on the sleeve 6, and the slot or recess 18 of the embodiment illustrated in FIG. 1, or the slot or recess 38 of the embodiment illustrated in FIG. 8 are formed in the sleeve 6 instead of in the annular extension 11 to cooperate with one another, would not depart from the general spirit of the invention.

The term "angular" when used in the claims refers to the recesses 18 and 41 to connote that they may be either right angular or arcuate.

It is obvious that various changes and modifications may be made to the details of construction without departing from the general spirit of the invention as set forth in the appended claims.

I claim:

1. In a commodity processing machine, the combination of a frame having a sleeve, said sleeve having a first annular extension, a fixed pin protruding from the inner periphery of said first annular extension, and a casing having a worm for a rotary cutter, said casing having a second annular extension fitting into said first annular extension, said second annular extension having a first recess in its outer periphery to receive said fixed pin and enable said casing when turned to be drawn into operative position, a second lock for anchoring said second annular extension to said first annular extension, a locking ring for anchoring said worm in place, said worm rotating in a counterclockwise direction in said casing when functioning, said first recess cooperating with said fixed pin to anchor said casing to said frame when said casing rotates in a counterclockwise direction relative to said frame, said ring screw-threadedly connected to said casing rotating in a clockwise direction when being turned into anchoring position in order to enable said worm when functioning to cooperate with said first recess and fixed pin to anchor said casing to said frame, and said locking ring when turning into locking position indicating to the attendant that the casing is not in locked position with said fixed pin should the rotation of said locking ring turn said casing a clockwise out of locking relation with said fixed pin.

2. In a commodity processing machine, the combination of a frame having a sleeve, said sleeve having a first annular extension, a fixed pin protruding from the inner periphery of said first annular extension, and a casing having a worm and a rotary cutter, said casing having a second annular extension fitting into said first annular extension, said second annular extension having an angular recess in its outer periphery to receive said fixed pin and enable said casing when turned to be drawn into operative position, said first annular extension having a rotatable cam pin extending into said sleeve and communicating with the interior of said sleeve, said cam pin having an arcuate recess to conform to the cylindrical interior of said sleeve in one position of the cam pin and obstructing a segment of the cylindrical interior of said sleeve in another position of said cam pin, there being a lateral recess extending inwardly from the outer face of said second annular extension to receive a portion of said cam pin when turned into its obstructing position after said fixed pin and angular recess have brought said casing into operative position with said sleeve, said lateral recess clearing said cam pin and receiving said cam pin in obstructing position when said casing has been turned relative to said angular recess into operative position to enable said cam pin to lock said casing to said frame, a perforated disk cooperating with said cutter, a locking ring for anchoring said disk, cutter and worm in place, said worm rotating in a counterclockwise direction in said casing when functioning, said angular recess cooperating with said fixed pin to anchor said casing to said frame when said casing rotates in a counterclockwise direction relative to said frame, said ring screw threadedly connected to said casing rotating in a clockwise direction when being turned into anchoring position in order to enable said worm when functioning to cooperate with said angular recess and fixed pin to anchor said casing to said frame, and said locking ring when turning into locking position indicating to the attendant that the casing is not in locked position with said fixed pin should the rotation of said locking ring turn said casing clockwise out of locking relation with said fixed pin.

3. In a commodity processing machine, the combination of a frame having a sleeve, said sleeve having a first annular extension, and a casing having a worm for a rotary cutter, said casing having a second annular extension fitting into said first annular extension, a fixed pin and first recess cooperating with one another, one in the inner periphery of said first annular extension and the other in the outer periphery of said second annular extension to enable said casing when turned to be drawn into operative position, said first annular extension having a rotatable cam pin extending into said sleeve and communicating with the interior of said sleeve, said cam pin having a recess to conform to the cylindrical interior of said sleeve in one position of the cam pin and obstructing a segment of the cylindrical interior of said sleeve in another position of said cam pin, there being a lateral recess extending inwardly from the outer face of said second annular extension receiving a portion of said cam pin when turned into its obstructing position after said fixed pin and said first recess have brought said casing into operative position with said sleeve, a locking ring for anchoring said worm in place, said worm rotating in a counterclockwise direction in said casing when functioning, said first recess cooperating with said fixed pin to anchor said casing to said frame when said casing rotates in a counterclockwise direction relative to said frame, said ring screw-threadedly connected to said casing rotating in a clockwise direction when being turned into anchoring position in order to enable said worm when functioning to cooperate with said first recess and fixed pin to anchor said casing to said frame, and said locking ring when turning into locking position indicating to the attendant that the casing is not in locked position with said fixed pin should the rotation of said locking ring turn said casing clockwise out of locking relation with said fixed pin.

References Cited in the file of this patent

UNITED STATES PATENTS

| | | |
|---|---|---|
| 808,008 | Cagle | Dec. 19, 1905 |
| 1,803,261 | Kubis | Apr. 28, 1931 |
| 2,211,842 | Anderson et al. | Aug. 20, 1940 |
| 2,531,158 | Robinson | Nov. 21, 1950 |